United States Patent
Lemko et al.

(10) Patent No.: US 10,583,587 B2
(45) Date of Patent: Mar. 10, 2020

(54) METHOD FOR PRODUCING A FIBER-REINFORCED PLASTIC COMPONENT

(71) Applicant: Bayerische Motoren Werke Aktiengesellschaft, Munich (DE)

(72) Inventors: Beniamin Lemko, Landshut (DE); Christoph Mersmann, Landshut (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 184 days.

(21) Appl. No.: 15/353,755

(22) Filed: Nov. 17, 2016

(65) Prior Publication Data
US 2017/0066161 A1 Mar. 9, 2017

Related U.S. Application Data

(63) Continuation of application No. PCT/EP2015/067130, filed on Jul. 27, 2015.

(30) Foreign Application Priority Data

Aug. 12, 2014 (DE) ........................ 10 2014 215 965

(51) Int. Cl.
*B29C 33/48* (2006.01)
*B29C 33/50* (2006.01)
(Continued)

(52) U.S. Cl.
CPC ............ *B29C 33/485* (2013.01); *B29C 33/40* (2013.01); *B29C 33/505* (2013.01);
(Continued)

(58) Field of Classification Search
None
See application file for complete search history.

(56) References Cited

U.S. PATENT DOCUMENTS 3,600,918 A * 8/1971 Lemelson ............ B29C 43/222
                                                    264/132
5,547,629 A    8/1996 Diesen et al.
(Continued)

FOREIGN PATENT DOCUMENTS

CN    101733927 A    6/2010
CN    103269841 A    8/2013
(Continued)

OTHER PUBLICATIONS

Chinese-language Office Action issued in counterpart Chinese Application No. 201580020881.6 dated Feb. 2, 2018 with English translation (12 pages).
(Continued)

*Primary Examiner* — Monica A Huson
(74) *Attorney, Agent, or Firm* — Crowell & Moring LLP

(57) ABSTRACT

A method is provided for producing a fiber-reinforced plastic component, in particular for use in a motor vehicle. The method includes the acts of: providing a blow-molded hollow core, forming the fiber-reinforced plastic component on the hollow core; inserting an end of the hollow core between a first roller and a first counter element, and drawing the hollow core from the plastic component by rotationally driving the first roller.

14 Claims, 4 Drawing Sheets

(51) Int. Cl.
*B29C 70/32* (2006.01)
*B29C 70/48* (2006.01)
*B29C 33/40* (2006.01)
*B29C 45/00* (2006.01)
*B29C 45/02* (2006.01)
*B29C 45/26* (2006.01)
*B29C 45/73* (2006.01)
*B29L 22/00* (2006.01)
*B29K 105/08* (2006.01)
*B29K 307/04* (2006.01)
*B29L 23/00* (2006.01)
*B29L 31/30* (2006.01)

(52) U.S. Cl.
CPC .......... *B29C 45/0005* (2013.01); *B29C 45/02* (2013.01); *B29C 45/261* (2013.01); *B29C 45/7312* (2013.01); *B29C 70/32* (2013.01); *B29C 70/48* (2013.01); *B29C 2045/0087* (2013.01); *B29K 2105/0827* (2013.01); *B29K 2307/04* (2013.01); *B29L 2022/00* (2013.01); *B29L 2023/22* (2013.01); *B29L 2031/30* (2013.01)

(56) References Cited

U.S. PATENT DOCUMENTS

| | | |
|---|---|---|
| 2009/0309264 A1 | 12/2009 | Cavaliere |
| 2010/0044912 A1 | 2/2010 | Zahlen et al. |
| 2010/0092708 A1 | 4/2010 | Jacob et al. |
| 2011/0277918 A1 | 11/2011 | Lee et al. |

FOREIGN PATENT DOCUMENTS

| | | |
|---|---|---|
| DE | 1 704 266 A | 5/1971 |
| DE | 10 2006 031 323 A1 | 1/2008 |
| DE | 10 2006 031 336 A1 | 1/2008 |
| DE | 10 2007 027 755 A1 | 12/2008 |
| DE | 10 2008 054 540 A1 | 6/2010 |
| DE | 10 2012 201 262 A1 | 8/2013 |
| EP | 2 497 623 A1 | 9/2012 |
| EP | 2 527 122 A1 | 11/2012 |
| FR | 2 898 539 A1 | 9/2007 |

OTHER PUBLICATIONS

International Search Report (PCT/ISA/210) issued in PCT Application No. PCT/EP2015/067130 dated Nov. 16, 2015 with English translation (eight pages).

German-language Written Opinion (PCT/ISA/237) issued in PCT Application No. PCT/EP2015/067130 dated Nov. 16, 2015 (five pages).

German Search Report issued in counterpart German Application No. 10 2014 215 965.2 dated Mar. 19, 2015 with partial English translation (10 pages).

Chinese Office Action issued in Chinese counterpart application No. 201580020881.6 dated Aug. 3, 2018, with English translation (14 pages).

* cited by examiner

METHOD FOR PRODUCING A FIBER-REINFORCED PLASTIC COMPONENT

CROSS REFERENCE TO RELATED APPLICATIONS

This application is a continuation of PCT International Application No. PCT/EP2015/067130, filed Jul. 27, 2015, which claims priority under 35 U.S.C. § 119 from German Patent Application No. 10 2014 215 965.2, filed Aug. 12, 2014, the entire disclosures of which are herein expressly incorporated by reference.

BACKGROUND AND SUMMARY OF THE INVENTION

The present invention relates to a method and to a corresponding apparatus for producing a fiber-reinforced plastic component. The plastic component is intended, in particular, for use in a motor vehicle.

The prior art discloses, for example in DE 10 2007 027 755 A1, a method for producing a fiber-reinforced plastic component by use of resin transfer molding. Blow-molded hollow cores which are composed of thermoplastic are used in this method. Fiber material is wrapped around the hollow cores and the hollow cores are filled with water in a subsequent process, in order to be able to withstand the high injection pressure of the inflowing resin.

The object of the present invention is to provide a method for producing a fiber-reinforced plastic component which exhibits process reliability while being carried out in a cost-effective manner and is, therefore, suitable for industrial production. A further goal is to provide a corresponding apparatus for carrying out the method.

This and other objects are achieved by a method for producing a fiber-reinforced plastic component. In particular, the plastic component which is produced in this manner, is used in a motor vehicle. The method includes at least the following acts in the indicated order: (i) providing a blow-molded hollow core, (ii) molding the fiber-reinforced plastic component on the hollow core, (iii) inserting one end of the hollow core between a first roller and a first counter (mating) element, and (iv) drawing the hollow core out of the plastic component by rotationally driving the roller. The counter element is, in particular, in the form of a further roller, so that a pair of rollers is used. The "rotational driving" means that the roller is driven, for example, by use of an electric motor. Therefore, no rotational indirect movement of the roller takes place due to some other movement of the hollow core. Rather, the hollow core is moved by rotationally driving the roller.

Clamping the hollow core by use of pincers and withdrawing the hollow core from the plastic component by use of a winch has also been taken into consideration within the scope of the invention. One disadvantage of this, amongst others, has been found to be that the very long hollow core is withdrawn over a long distance or is wrapped up around the winch. When the end of the hollow core is drawn, the core stretches multiply, wherein local increases in force, in particular at the tapered portion produced, lead to undefined tearing of the hollow core before it is completely withdrawn. Therefore, it has been identified within the scope of the invention that the hollow core has to be withdrawn by the first roller, which can be driven, and the counter element for the purpose of producing appropriate quantities with the appropriate quality. The removed hollow core can be recycled directly downstream of the combination comprising the first roller and a corresponding counter element.

When the hollow core is drawn, it generally stretches. However, a defined method act for stretching the hollow core is preferably provided in order to release the hollow core from the plastic component. In addition to inserting the hollow core between the first roller and the first counter element, at least one further end of the hollow core is inserted into a holding apparatus during said method act. The first roller is rotationally driven and/or the further end is moved by way of the holding apparatus in order to then stretch the hollow core. In this case, the two ends of the hollow core are preferably situated opposite one another. When the hollow core is stretched, it is elongated and therefore detaches from the plastic component. This is carried out, in particular, in the case of very long plastic components.

After the hollow core is stretched, it is preferably provided that the holding apparatus is released again and, therefore, the hollow core can be withdrawn by way of the first roller and the first counter element. However, the hollow core may also tear during stretching. In this case, the hollow core is withdrawn both by way of the first roller and by way of the holding apparatus.

The holding apparatus preferably comprises a second roller and a corresponding second counter (mating) element. The further end of the hollow core is inserted between the second roller and the second counter element. When the hollow core is stretched, it is provided that the first roller and/or also the second roller are rotationally driven.

The first counter element and/or the second counter element are/is preferably in the form of further rollers. These further rollers can be rotationally driven or can be freely rotated. The first roller, together with the first counter element, therefore constitutes a first pair of rollers. The second roller and the second counter element therefore constitute a second pair of rollers.

The hollow core is preferably composed of thermoplastic and can therefore be recycled. To this end, the drawn hollow core is melted and processed to form a new hollow core.

In particular, it is provided that, before the hollow core is melted, at least one of the ends of the hollow core is removed and is not processed to form a new hollow core. The ends of the hollow core are usually contaminated and should therefore not be supplied to the recycling process.

Before the hollow core is melted, the drawn hollow core is preferably comminuted. This comminution preferably takes place directly behind the rollers. The ends are preferably removed before the hollow core is comminuted.

It is advantageously provided that the hollow core is filled with a liquid medium, in particular water, during molding of the plastic component. The liquid medium is drained before the hollow core is drawn.

The hollow core is preferably molded by way of resin transfer molding in a corresponding mold. Before the hollow core is inserted into the mold, corresponding reinforcement fibers, in particular which are composed of carbon and/or glass, are wrapped around or braided with the hollow core. In the mold, plastic, in particular resin, is injected into and onto the reinforcement fibers.

After the fiber-reinforced plastic component is molded, the hollow core, together with the plastic component, is preferably inserted into a corresponding cooling apparatus. The inside dimensions of this cooling apparatus correspond approximately to the mold, so that the cooling apparatus is a mold-like cooling apparatus. The plastic component is fixed within this cooling apparatus, so that the hollow core is preferably also drawn here. However, as an alternative, it is also provided that the plastic component remains in the mold of the resin transfer molding process for the purpose of drawing the hollow core.

It is preferably provided that negative pressure is generated in the hollow core, as a result of which the hollow core can collapse after the resin injection and the curing process in the mold, so that the core can be withdrawn from the component with application of less force. This can be performed in addition to or as an alternative to stretching the hollow core.

The invention further includes an apparatus for carrying out the above-described method. To this end, the apparatus includes a first roller and a corresponding counter element, which is preferably in the form of a further roller. As has been described in the method, the first roller and the first counter element serve to insert the end of the hollow core and to draw the hollow core.

The advantageous refinements described within the scope of the method and dependent claims are accordingly advantageously used in the apparatus according to the invention.

Therefore, it is provided, in particular, that the apparatus according to the invention preferably also includes the holding apparatus. The holding apparatus for its part preferably includes the second roller and the second counter element.

The method described within the scope of the invention for drawing the hollow core by way of the first roller, preferably by way of the first pair of rollers, requires less expenditure on equipment than the prior art.

Other objects, advantages and novel features of the present invention will become apparent from the following detailed description of one or more preferred embodiments when considered in conjunction with the accompanying drawings.

DETAILED DESCRIPTION OF THE DRAWINGS

An exemplary embodiment of the method according to the invention will be described using the accompanying drawings and the text which follows.

Figure 1:
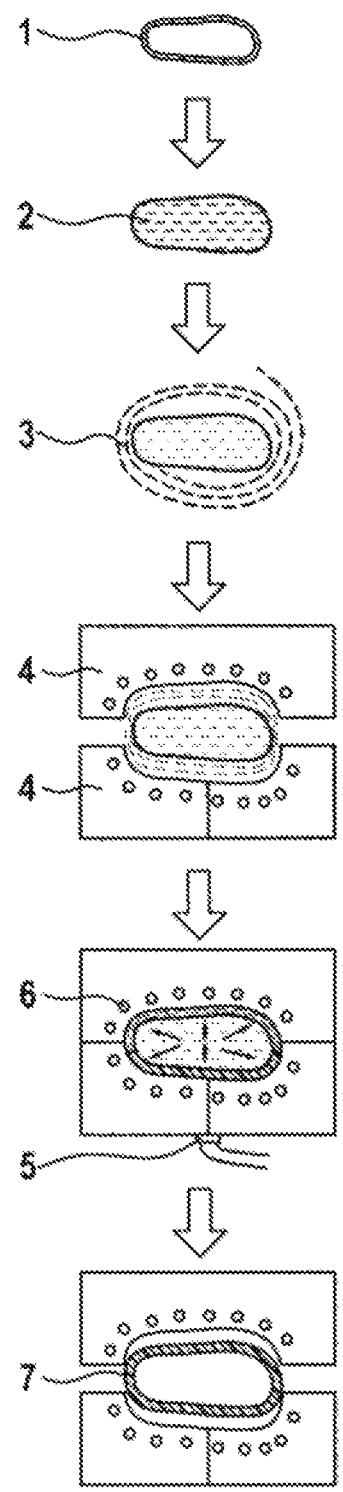
FIG. 1 is a flow diagram illustrating the first actions steps of the method according to an exemplary embodiment of the invention.

Using a plurality of schematic illustrations, FIG. 1 shows the processes of providing a blow-molded hollow core 1 and molding a fiber-reinforced plastic component 7 on the hollow core 1 by resin transfer molding.

Firstly, a hollow core 1 which is produced from a thermoplastic by blow molding is provided. The hollow core 1 forms the inner contour for the plastic component 7 which is to be produced.

For reasons of cost, the hollow core 1 has very thin walls. The hollow core 1 is dimensionally stable in the unstressed state. However, at the latest when the resin is injected, the hollow core 1 is filled with a liquid medium, in particular water. After the hollow core 1 is filled, it is closed.

The hollow core 1 is braided with reinforcement fibers 3, in particular fibers which are composed of carbon. Particularly when reinforcement fibers 3 are wrapped around the hollow core 1 with a relatively high tensile stress, it is useful to fill the hollow core 1 with the liquid medium before the wrapping operation.

The braided hollow core 1 is then placed into a mold 4 for the resin transfer molding process. The cavity of the mold 4 corresponds to the outer contour of the plastic component 7 which is to be produced. After the mold 4 is closed, a system comprising epoxy resin and curing agent is injected into the intermediate space between the hollow core 1 and the mold 4 under a pressure of, for example, 80 bar by means of a filling system 5.

As a result of the mold 4 being heated, by a correspondingly heated liquid being conducted through heating tubes 6, the plastic matrix is finally cured. After the plastic matrix is cured, the liquid medium is drained from the hollow core 1.

This is followed by the hollow core 1 being removed from the plastic component 7. The plastic component 7 either remains in the mold 4 or is inserted into a mold-like cooling apparatus in the process.

FIGS. 2-6 show the corresponding steps for removing the hollow core 1. The figures show the method steps in a purely schematic manner. In particular, the plastic component 7 is illustrated in simplified form in these figures and represents plastic components 7 with a wide variety of geometries, in particular relatively long plastic components 7.

An apparatus for carrying out the method includes a first roller 8 with an associated first counter (mating) element 11. The first counter element 11 is likewise in the form of a roller in the exemplary embodiment. At least the first roller 8, and preferably the first counter element 11, can be rotationally driven.

Figure 2:
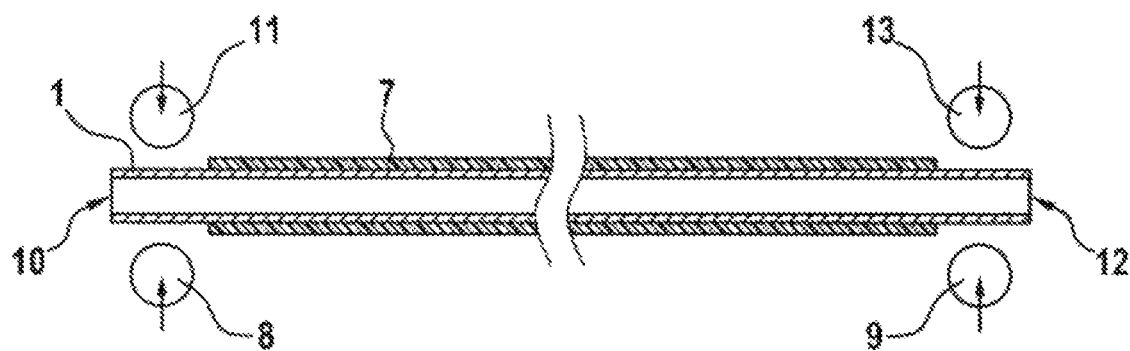
FIGS. 2-6 each illustrate a method act for removing the hollow core from the plastic component according to an exemplary embodiment of the invention.

As indicated by the corresponding arrows in FIG. 2, the first roller 8 and the first counter element 11 can be moved toward one another. As a result, one end 10 of the hollow core 1 can be inserted between the first roller 8 and the first counter element 11.

FIG. 2 further shows a second roller 9 with a second counter (mating) element 13 at an opposite further end 12 of the hollow core 1. The second counter element 13 is also in the form of a roller here. The second roller 9 and preferably also the second counter element 13 can be rotationally driven. The further end 12 can be clamped by moving the second roller 9 and the second counter element 13.

As an alternative to forming the two counter elements 11, 13 as rollers, these counter elements 11, 13 can also be in the form of sliding surfaces. Therefore, it is respectively sufficient for at least one roller 8, 9 to be provided at the two ends 10, 12 for the purposes of clamping and moving the hollow core 1.

Figure 3:
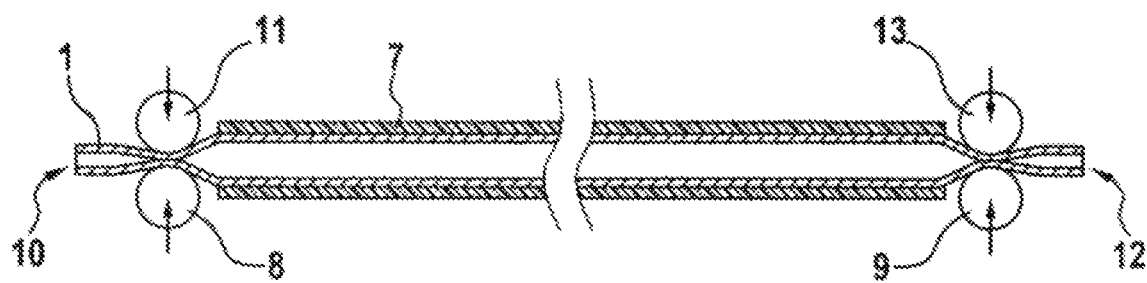
Figure 4:
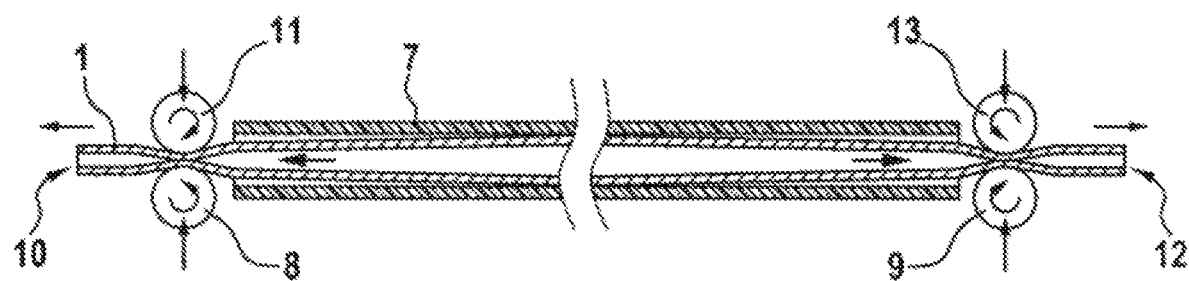

FIGS. 3 and 4 show the process of stretching the hollow core 1. According to FIG. 3, the two ends 10, 12 are clamped between the pairs of rollers. According to FIG. 4, the two rollers 8, 9 and preferably also the counter elements 11, 13 are driven in such a way that the two ends 10, 12 are drawn in different, preferably in opposite, directions. As a result, the hollow core 1 stretches and at the same time detaches from the plastic component 7.

Instead of the second roller 9 and the second counter element 13, only one single holding apparatus could be used for fixing the further end 12. It is possible for the hollow core 1 to stretch and at the same time detach in this case too. However, particularly for very long components, it is useful, in line with FIG. 4, to draw on both ends 10, 12 for stretching purposes.

Figure 5:
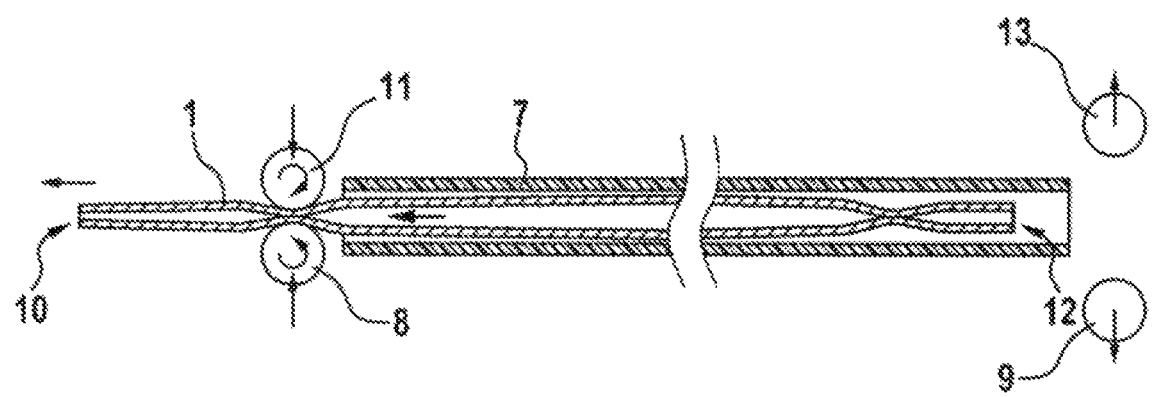

FIG. 5 shows the process of drawing the hollow core 1 out of the plastic component 7. To this end, the further end 12 is released from the fixing arrangement between the second roller 9 and the second counter element 13 and withdrawn from the plastic component 7 by way of the first roller 8 and the first counter element 11.

Figure 6:
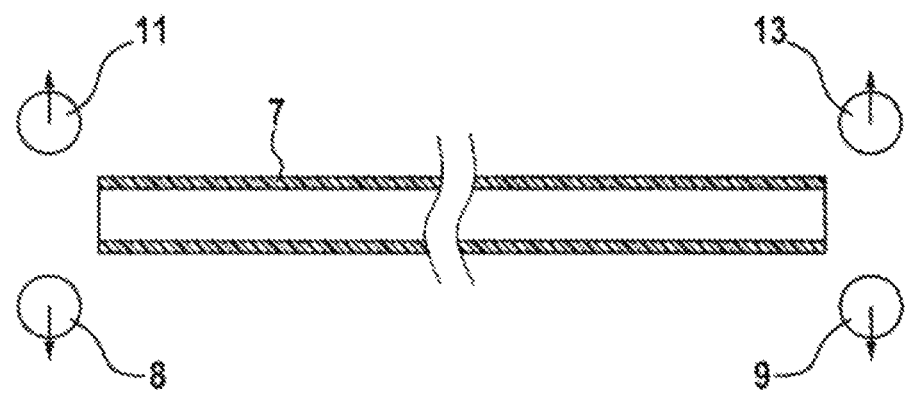

FIG. 6 shows the plastic component 7 without the hollow core 1.

The hollow core 1 can be comminuted and recycled directly after being withdrawn in line with FIG. 5. In particular, the ends 10, 12 are not used for producing new hollow cores 1 in this case on account of the ends being contaminated.

LIST OF REFERENCE SYMBOLS

1. Hollow core
2. Liquid medium
3. Reinforcement fibers
4. Mold
5. Filling system
6. Heating tubes
7. Plastic component
8. First roller
9. Second roller
10. End
11. First counter element
12. Further end
13. Second counter element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a fiber-reinforced plastic component, the method comprising the acts of:
    providing a hollow core;
    molding the fiber-reinforced plastic component on the hollow core;
    inserting one end of the hollow core between a first roller and a first counter element; and
    drawing the hollow core out of the fiber-reinforced plastic component by rotationally driving the first roller.

2. The method according to claim 1, wherein, before the hollow core is drawn out of the fiber-reinforced plastic component, the hollow core is stretched by:
    inserting at least one further end of the hollow core into a holding apparatus; and
    stretching the hollow core by rotationally driving the first roller and/or by moving the further end by way of the holding apparatus for releasing the hollow core from the fiber-reinforced plastic component.

3. The method according to claim 2, wherein the holding apparatus comprises a second roller and a second counter element, wherein the first roller and/or the second roller are rotationally driven for stretching purposes.

4. The method according to claim 3, wherein the first counter element and/or the second counter element are in the form of further rollers, wherein the further rollers are rotationally drivable or are freely rotatable.

5. The method according to claim 1, wherein the drawn hollow core, which is composed of thermoplastic, is melted and processed to form a new hollow core.

6. The method according to claim 5, wherein, before the hollow core is melted, at least one of the ends of the hollow core is removed and is not processed to form the new hollow core.

7. The method according to claim 1, wherein the hollow core is filled with a liquid medium during molding of the fiber-reinforced plastic component, wherein the liquid medium is drained before the hollow core is drawn.

8. The method according to claim 1, wherein the hollow core is molded by resin transfer molding in a mold or wherein the hollow core is a blow-molded hollow core.

9. The method according to claim 1, wherein the fiber-reinforced plastic component is seated in the mold or in a mold cooling apparatus while drawing the hollow core.

10. The method according to claim 1, wherein negative pressure is generated in the hollow core, as a result of which the hollow core collapses and detaches from the fiber-reinforced plastic component.

11. The method according to claim 1, wherein the method produces a motor vehicle fiber-reinforced plastic component.

12. An apparatus for producing a fiber-reinforced plastic component, comprising:
    a first roller and a first counter element;
    a hollow core with a produced fiber-reinforced plastic component disposed on the hollow core;
    a drive, wherein the first roller is drivable in a first direction by the drive;
    wherein a first end of the hollow core that extends beyond a first end of the produced fiber-reinforced plastic component is clampable between the first roller and the first counter element; and
    a second roller and a second counter element, wherein the second roller is rotationally drivable in a second direction which is opposite the first direction, wherein a second end of the hollow core that extends beyond a second end of the produced fiber-reinforced plastic component is clampable between the second roller and the second counter element, and wherein the second end is opposite the first end;
    wherein the hollow core is stretchable when the first and the second rollers are rotationally driven in the opposite first and second directions.

13. The apparatus according to claim 12, wherein the first counter element and the second counter element are in a form of further rollers, wherein the further rollers are rotationally drivable or are freely rotatable.

14. The apparatus according to claim 12, wherein the first counter element is a sliding surface.

* * * * *